(12) United States Patent
Larlus et al.

(10) Patent No.: US 9,272,919 B2
(45) Date of Patent: Mar. 1, 2016

(54) HYDROTHERMAL SYNTHESIS OF ZEOLITES OR ZEOLITE-LIKE MATERIALS USING MODIFIED MIXED HYDROXIDES

(75) Inventors: Olivier Larlus, Rosenheim (DE); Martin Claus, München (DE); Rainer Albert Rakoczy, Rosenheim (DE)

(73) Assignee: SUED-CHEMIE IP GMBH & CO. KG, Munich (DE)

( * ) Notice: Subject to any disclaimer, the term of this patent is extended or adjusted under 35 U.S.C. 154(b) by 190 days.

(21) Appl. No.: 13/816,276

(22) PCT Filed: Jul. 28, 2011

(86) PCT No.: PCT/EP2011/063005
§ 371 (c)(1),
(2), (4) Date: Jun. 5, 2013

(87) PCT Pub. No.: WO2012/019923
PCT Pub. Date: Feb. 16, 2012

(65) Prior Publication Data
US 2013/0245349 A1    Sep. 19, 2013

(30) Foreign Application Priority Data
Aug. 11, 2010 (DE) .......................... 10 2010 034 005

(51) Int. Cl.
*C01B 39/00* (2006.01)
*C01B 33/36* (2006.01)
*C01F 7/00* (2006.01)
*C01B 39/32* (2006.01)
(Continued)

(52) U.S. Cl.
CPC ............... *C01B 39/32* (2013.01); *C01B 13/363* (2013.01); *C01B 13/366* (2013.01); *C01B 39/06* (2013.01); *Y10T 428/2982* (2015.01)

(58) Field of Classification Search
CPC .... C01B 13/363; C01B 39/06; C01B 13/366; C01B 39/32; Y10T 428/2982
USPC ...................... 585/418, 475; 423/700; 502/60
See application file for complete search history.

(56) References Cited

U.S. PATENT DOCUMENTS

| 3,216,789 A | 11/1965 | Breck et al. |
| 4,530,824 A | 7/1985 | Arika et al. |
| 4,657,749 A | 4/1987 | Vaughan |

(Continued)

FOREIGN PATENT DOCUMENTS

| EP | 0096479 A1 * | 12/1983 |
| EP | 0219354 A2 | 4/1987 |

(Continued)

OTHER PUBLICATIONS

English translation of International Search Report, dated Feb. 23, 2012, with respect to International Application Serial No. PCT/EP2011/063005.

(Continued)

*Primary Examiner* — Colleen Dunn
*Assistant Examiner* — Haytham Soliman
(74) *Attorney, Agent, or Firm* — Anthony A. Bisulca (57) ABSTRACT

This invention relates to a process for producing aluminum silicates in the form of zeolite L, as well as the intermediate and end products of this process. The invention further relates to the use of these aluminum silicates for the conversion or adsorption of hydrocarbons.

22 Claims, 2 Drawing Sheets

(51) Int. Cl.
*C01B 13/36* (2006.01)
*C01B 39/06* (2006.01)

(56) References Cited

U.S. PATENT DOCUMENTS

| | | |
|---|---|---|
| 4,888,105 A | 12/1989 | Huss, Jr. et al. |
| 5,017,353 A | 5/1991 | Verduijn |
| 5,330,736 A | 7/1994 | Wu et al. |
| 5,785,945 A | 7/1998 | Miller |
| 5,919,722 A * | 7/1999 | Verduijn et al. ............... 502/66 |
| 2011/0201859 A1 | 8/2011 | Omegna et al. |

FOREIGN PATENT DOCUMENTS

| | | |
|---|---|---|
| EP | 0357252 A1 | 3/1990 |
| JP | S62132726 A | 6/1987 |

OTHER PUBLICATIONS

English translation of International Preliminary Report on Patentability and Written Opinion with respect to International Application Serial No. PCT/EP2011/063005.

English translation of Office Action issued by Japanese Patent Office, dated Mar. 12, 2014, with respect to Japanese Patent Application No. 2013-523559 (Japanese equivalent to instant U.S. application).

* cited by examiner

HYDROTHERMAL SYNTHESIS OF ZEOLITES OR ZEOLITE-LIKE MATERIALS USING MODIFIED MIXED HYDROXIDES

This invention relates to a process for producing aluminium silicates in the form of zeolite L, as well as the intermediate and end products of this process. The invention further relates to the use of these aluminium silicates for the conversion or adsorption of hydrocarbons.

BACKGROUND OF THE INVENTION

Of the numerous methods that are available to solid-state chemistry, hydrothermal synthesis represents the most suitable method for synthesizing zeolites. The first zeolite syntheses were carried out in 1862 by St. Claire Deville (levyne) and in 1882 by De Schulten (analcime) under hydrothermal conditions.

The first zeolite syntheses which led to uniform and clearly characterized products took place around the middle of the last century. Thus, using reactive aluminosilicate gels, Milton succeeded in synthesizing zeolites with large pore openings and correspondingly high adsorption capacities. At approximately the same time, Barrer and his colleagues established the principles of modern zeolite synthesis by carrying out systematic studies and improving methods.

The educts which are necessary for a zeolite synthesis can be divided into the following five types:
- source of the T-atoms, thus e.g. a silicon and/or an aluminium source,
- templates,
- mineralizers,
- solvents, and
- possibly seed crystals.

The T-atoms are limited by the following selection rules:
- ion radius ratio $R(T^{n+})/R(O^{2-})$ of from 0.223 to 0.414 (Pauling's rule),
- the electronegativity allows a stable bond with oxygen,
- the oxidation state lies between +2 and +5,
- the solubility improves due to polyanions or formation of $TO^{2-}$ units,
- the resultant framework has charge centres with a charge between −1 and 0.

As a rule, the following silicon sources are used for the synthesis of zeolites:
- sodium water glass (sodium silicate solutions), alkali metasilicates and alkali water glass solutions,
- precipitated silicas,
- pyrogenic silicic acids, $SiO_2$-rich flue ash and insoluble silicates,
- silicon-rich aluminas,
- silica sols (colloidally dissolved $SiO_2$),
- organosilicon compounds (usually orthosilicic acid esters).

The following are often used as aluminium sources:
- aluminium salts of mineral acids or organic acids,
- aluminium oxides or hydroxides and sols thereof (colloidal solutions)
- aluminium alcoholates
- elemental aluminium
- aluminium-rich earths, aluminium-rich flue ash As a rule, templates are mono- or polyvalent inorganic or organic cations. The templates have structure-directing properties and stabilize the zeolite structure that forms during the synthesis. Some representative examples may be named:
- $Sr^{2+}$ or $K^+$ for the synthesis of the zeolite ferrierite (FER)
- tetramethylammonium cations for the synthesis of ZSM-5 (MFI),
- $K^+$ [18-crown-6] for the synthesis of the zeolites MCM-61 (MSO) or EMC-2 (EMT),
- [bis(pentamethylcyclopentadienyl) Co(II)]$^+$ complex for the synthesis of zeolite UTD-1 (DON).

However, in some syntheses uncharged organic compounds are also used, such as e.g. pyrrolidine or ethylenediamine in the synthesis of ZSM-35 (FER).

Hydroxide ions mainly serve as mineralizers. One of the most important functions of the mineralizers is to dissolve the amorphous aluminosilicates during the synthesis. However, mineralizers also serve to increase the solubility of the species that contain the T-atoms. This is brought about e.g. by achieving an ideal pH (possibly additional buffer action), increasing the ionic strength (addition of foreign ions) or complexing the T-atom. Therefore, other soluble compounds which have e.g. complex-forming properties are also often used as mineralizers.

Water is mainly used as solvent. However, there are also syntheses in non-aqueous solvents, such as e.g. in pyridine or glycerol. The admixing of alcohols to aqueous synthesis gels is likewise possible.

The formation mechanism concepts for zeolite synthesis can be described as follows. In the majority of cases, synthesis gels are prepared in a sol-gel process. Ideally, the starting point is a solution, or several solutions, colloids (sols) or suspensions which, by suitable blending, are converted to an amorphous gel which crystallizes out under hydrothermal conditions. For a clearer understanding, the zeolite synthesis can be divided into the following part-steps:
- gel preparation,
- achieving supersaturation,
- nucleation, and
- crystal growth.

The molar composition of the synthesis gel is the most important factor that determines the reaction products. The following notation is usually used:

$$aSiO_2:Al_2O_3:bM_xO:cN_yO:dR:eH_2O$$

M and N stand for e.g. alkali or alkaline-earth ions and R for an organic template. Furthermore, the coefficients a to e indicate the molar ratios relative to one mole aluminium(III) oxide. During the gel preparation, the individual starting mixtures are blended, and if necessary the required pH is set. An amorphous precipitate forms (e.g. an aluminosilicate). The obtained products (e.g. their crystallite size) can be influenced by ageing, thermal treatment or ultrasonic treatment of the starting mixtures or of the synthesis gels.

After the formation of the precipitate, it is important to achieve supersaturation as this has an influence on the nucleation. Above all, the mineralizers are necessary for the supersaturation as they partially dissolve the high-molecular-weight system either already during the gel preparation (in an ageing step) or during the synthesis (before the actual nucleation) and provide smaller agglomerates. These can be dissolved in the aqueous phase again, possibly form further crystal nuclei, enlarge existing crystal nuclei or be incorporated into existing crystallites (R. A. Rakoczy, *Hydrothermalsynthese ausgewählter Zeolithe und ihre Charakterisierung durch Adsorption*, Dissertation, University of Stuttgart, 2004).

The zeolite L that is relevant within the framework of this invention (also called aluminium silicate LTL) has a zeolite system with 12-ring pores which crystallizes with a hexagonal unit cell. Zeolite L has a one-dimensional pore system with a pore diameter of approximately 7.1 Å and an average silicon-aluminium ratio of approximately 6. Because of this large pore diameter, zeolites L are particularly suitable for catalytic reactions of large molecules such as long-chain aliphatic compounds (C. Baerlocher, W. M. Meier, D. H. Olson, *Atlas of Zeolite Framework Types*, fifth revised edition 2001, Elsevier, Amsterdam-London-New York-Oxford-Paris-Shannon-Tokyo, page 170). LTL-type aluminium silicates display a typical X-ray diffraction pattern with the following dominant reflections (Cu Kα1 with a wavelength of 1.5406 Å) and typical d(Å) values:

| 2 Theta (°) | d (Å) |
|---|---|
| 5.54 | 15.9 |
| 11.75 | 7.5 |
| 14.69 | 6.0 |
| 15.20 | 5.8 |
| 19.27 | 4.6 |
| 20.45 | 4.3 |
| 22.64 | 3.9 |
| 24.30 | 3.6 |
| 25.57 | 3.5 |
| 27.09 | 3.3 |
| 27.97 | 3.2 |
| 29.07 | 3.1 |
| 29.64 | 3.0 |
| 30.68 | 2.9 |
| 33.72 | 2.7 |
| 34.18 | 2.6 |
| 35.82 | 2.5 |
| 36.96 | 2.4 |
| 41.00 | 2.2 |
| 48.37 | 1.9 |

The first explanations of the synthesis of the zeolite L can be found in U.S. Pat. No. 3,216,789. In a synthesis typical for this, a hydrated alumina is converted to a potassium aluminate by being dissolved in potassium hydroxide. Colloidal silica sol is then admixed. A synthesis gel with the following composition is obtained:

$8K_2O:Al_2O_3:20SiO_2:200H_2O$

The synthesis gel is kept at a temperature of 100° C. for 196 hours in a closable glass vessel. This crystallization process takes place without stirring. The zeolite L is obtained after separation and washing. This material is characterized by a characteristic X-ray powder diffractogram.

The synthesis of zeolite L is not usually simple, as often no phase-pure zeolite L is obtained, but zeolite W (MER) is additionally formed. Zeolite W is a small-pore zeolite (8-ring pores, diameter of less than 5 Å) which grows simultaneously in the synthesis gel that is intended for the production of zeolite L. Zeolite W displays an X-ray diffraction pattern with the following dominant reflections (Cu Kα1 with a wavelength of 1.5406 Å) and typical d(Å) values:

| 2 Theta (°) | d (Å) |
|---|---|
| 12.4 | 7.1 |
| 12.5 | 7.0 |
| 16.5 | 5.3 |
| 16.6 | 5.3 |
| 17.7 | 5.0 |
| 17.8 | 4.9 |
| 27.3 | 3.2 |
| 27.6 | 3.2 |
| 28.0 | 3.1 |
| 28.2 | 3.1 |
| 30.3 | 2.9 |
| 30.4 | 2.9 |

The presence of a by-product, such as e.g. zeolite W, can drastically reduce the activity of the large-pore zeolite L. The production of a high-purity zeolite L is therefore desirable.

U.S. Pat. No. 5,242,675 discloses a synthesis method which is intended to lead to phase-pure zeolite L. Aluminium hydroxide is dissolved in an alkaline lye by heating. After supplementing the evaporated quantity of water, a dilute colloidal silica sol is added and a synthesis gel is obtained, accompanied by stirring, which is crystallized out at 150° C. within 72 hours. A stainless steel pressure vessel lined with Teflon is used.

The crystallization batch was not stirred during the synthesis. A characteristic of the process is that the formation of zeolite W as a foreign phase is suppressed during the preparation of the synthesis gels by adding metal salts (e.g. barium, magnesium or calcium hydroxide) to the dilute colloidal silica sol solution.

A further production process for zeolite L is described in U.S. Pat. No. 4,530,824. In a first step, an "amorphous compound" which consists of a sodium aluminosilicate is produced, washed, added to a potassium hydroxide solution and crystallized out under hydrothermal conditions.

The silicon sources given above differ greatly in price. Thus an aqueous solution of sodium silicate, in particular a commercial sodium water glass solution, is much less expensive than a precipitated silica, a pyrogenic silicic acid or even a colloidal silica sol. This is similarly true for possible aluminium sources, thus aluminium sulphate is much less expensive than a sodium aluminate or an activated aluminium hydroxide.

However, the use of less expensive sodium silicate solutions is often ruled out, as a direct preparation of a synthesis gel from a sodium silicate solution leads to a composition which has too much sodium. In these cases, more expensive sources, such as precipitated silicas or colloidal silica sols, must therefore be used.

In the commercial production of zeolites and zeolite-like materials, the phase purity of the obtained product and the cost-effectiveness of the formulations used, i.e. the costs of the raw materials used and the yields obtained, in particular are of most interest.

There is therefore a need for an improved process for producing zeolite L and preliminary stages therefor. Consequently, the object of the invention is to provide a production process for zeolite L and preliminary stages therefor which can be carried out using more reasonably priced educts and which can be used in particular to produce a phase-pure zeolite L. The object is achieved by the preparation of an amorphous aluminium silicate precursor (mixed hydroxide) which can be modified subsequently and can be produced by precipitation using inexpensive silicon and aluminium sources, and from which a zeolite L can be obtained by further process steps via a synthesis gel.

SUMMARY OF THE INVENTION

The invention relates to a process for producing a mixed hydroxide and/or a synthesis gel, comprising:

(1) mixing a solution 1, a solution 2, and optionally at least one further solution, with a basic solution 3 in order to obtain a precipitate, (2) isolating and optionally drying the precipitate in order to obtain a mixed hydroxide, and optionally (3) dissolving or suspending the mixed hydroxide in a basic solution 4 in order to obtain a synthesis gel,
wherein
solution 1 comprises a silicon source and optionally a titanium source, a germanium source, a tin source and/or a phosphorus source in water or a water-alcohol mixture,
solution 2 comprises an aluminium source and optionally a boron source, a gallium source, an indium source and/or a phosphorus source in water or a water-alcohol mixture, and the substance quantities of the compounds used in solutions 1 and 2, the optional further solution(s) and the basic solution 3 satisfy equation (1):

$$1 < \frac{\Sigma nBa - \Sigma nSr}{n_{Al}} \quad (1)$$

wherein:
$\Sigma nBa$: means the sum of the substance quantities of the bases used Ba with a $pK_b<8$ (preferably $pK_b<5$) in each case multiplied by the number n of proton-transfer reaction stages with a $pK_B<8$,
$\Sigma nSr$: means the sum of the substance quantities of the acids used Sr with a $pK_S<4.5$ in each case multiplied by the number n of proton-transfer reaction stages with a $pK_S<4.5$,
$n_{Al}$: means the sum of the substance quantities of the aluminium used.

The invention further relates to a process for producing zeolites, in particular zeolite L, by hydrothermal treatment of the synthesis gel obtained using the process according to the invention.

In addition, the invention relates to the mixed hydroxide that can be obtained by the above-described processes, the synthesis gel or aluminium silicate, in particular the aluminium silicate of the structure type LTL (zeolite L). Moreover, the invention relates to the use of the aluminium silicate according to the invention (zeolite L) for the conversion or adsorption of hydrocarbons.

DETAILED DESCRIPTION OF THE INVENTION

The invention describes a process for producing an aluminium silicate precursor (mixed hydroxide), from which an aluminium silicate, in particular the aluminium silicate of the structure type LTL (zeolite L), can be obtained by further process steps.

The obtained precursor (mixed hydroxide) is optionally washed. Afterwards, the alkali content can additionally be set by suitable ion exchange. In addition, there is the possibility of drying the precursor, which makes storage possible or makes transport easier.

A clear advantage of the use of modifiable aluminium silicate precursors is that the chemical and physical properties of these precursors can be set by corresponding choice of the precipitation conditions or by corresponding choice of the secondary-treatment methods, in order that the subsequent hydrothermal crystallization proceeds optimally.

The individual process steps as well as the starting materials used in the production of the aluminium silicate precursor are described in detail below.

Firstly, a solution 1 and a solution 2 as well as optionally at least one further solution (thus one or more further solutions) are mixed with a basic solution 3. A precipitate which is isolated from the solution by suitable processes precipitates. The isolation usually takes place by filtration or centrifuging, preferably by filtration. A mixed hydroxide is hereby obtained which can optionally be washed and dried.

Solution 1 comprises a silicon source. Solution 1 can furthermore contain for example a titanium source, a germanium source, a tin source and/or a phosphorus source. Solution 1 preferably comprises a silicon source and a phosphorus source, particularly preferably a silicon source, a titanium source and a phosphorus source.

Solution 2 comprises an aluminium source. Solution 2 can furthermore contain for example a boron source, a gallium source, an indium source and/or a phosphorus source. Solution 2 preferably comprises an aluminium source and a phosphorus source, particularly preferably an aluminium source, a gallium source and a phosphorus source.

The optional, at least one further solution comprises in particular an alkaline salt, an alkaline-earth salt and/or an ammonium salt. The at least one further solution preferably comprises potassium carbonate, sodium carbonate, ammonium carbonate, barium hydroxide, magnesium hydroxide, calcium hydroxide and/or strontium hydroxide, preferably potassium carbonate, sodium carbonate and/or ammonium carbonate. Several solutions can also be used as the at least one further solution, wherein for example one can contain potassium carbonate, the other sodium carbonate, and a further one magnesium hydroxide. Mixtures of different and identical salts are also possible.

The basic solution 3 usually comprises potassium hydroxide, sodium hydroxide and/or ammonium hydroxide, preferably potassium hydroxide and/or sodium hydroxide, in particular potassium hydroxide.

For the production of the mixed hydroxide and thus also for the production of the synthesis gel or the zeolite L, it is advantageous if the quantity of available hydroxide ions relative to the quantity of aluminium ions in the mixture of solution 1, solution 2, solution 3 and the optionally at least one further solution is set such that the substance quantity ratio of the available hydroxide ions to aluminium ions is greater than 1, preferably lies in the range of from 1 to 5, still more preferably in the range of from 2.5 to 4.5, in particular in the range of from 3.8 to 4.2. The expression "quantity of available hydroxide ions" means the quantity of hydroxide ions which is present in this solution mixture or is formed by the presence of bases, and which reacts with $Al^{3+}$ ions to form aluminium hydroxide, or thereafter to form aluminates which are found in the precipitate. In a simple case in which solutions 1 to 3 as well as the optionally further solution exclusively contain strong monovalent bases in the form of alkali hydroxides as bases, the substance quantity of the available hydroxide ions corresponds to the substance quantity of the alkali hydroxides. On the other hand, in the case of strong divalent bases such as calcium hydroxide, the substance quantity of the available hydroxide ions is equal to twice the substance quantity of the bases used, as the second base constant (or proton-transfer reaction stage) $pK_{b2}=2.43$ (of $Ca(OH^+)_{aq}$). With moderately strong divalent bases such as $Na_2CO_3$, in which the second base constant $pK_{b2}=4.75$ (of $HCO_3^-$), in contrast, preferably only the simple substance quantity of the base used is taken into account for the calculation of the quantity of available hydroxide ions.

In other words, it is advantageous for the production of the mixed hydroxide and thus also for the production of the synthesis gel or the zeolite L if the substance quantities of the compounds used in solutions 1 and 2, the optional further solution(s) and the basic solution 3 satisfy equation (1):

$$1 < \frac{\Sigma nBa - \Sigma nSr}{n_{Al}} \quad (1)$$

wherein:

$\Sigma nBa$: means the sum of the substance quantities of the bases used Ba with a $pK_b < 8$ in each case multiplied by the number n of proton-transfer reaction stages with a $pK_b < 8$, $\Sigma nSr$: means the sum of the substance quantities of the acids used Sr with a $pK_s < 4.5$, in each case multiplied by the number n of proton-transfer reaction stages with a $pK_s < 4.5$, $n_{Al}$: means the sum of the substance quantities of the aluminium used.

Preferably, $\Sigma nBa$ is the sum of the substance quantities of the bases used Ba with a $pK_b < 5$ in each case multiplied by the number n of proton-transfer reaction stages with a $pK_B < 5$.

It is preferred for the production of the mixed hydroxide and thus also for the production of the synthesis gel or the zeolite L if the substance quantities of the compounds used in solutions 1 and 2, the optional further solution(s) and the basic solution 3 satisfy equation (1a):

$$1 < \frac{\Sigma nBa - \Sigma nSr}{n_{Al}} < 5, \quad (1a)$$

wherein $\Sigma nBa$, $\Sigma nSr$ and $n_{Al}$ have the above meanings.

It is still more preferred for the production of the mixed hydroxide and thus also for the production of the synthesis gel or the zeolite L if the substance quantities of the compounds used in solutions 1 and 2, the optional further solution(s) and the basic solution 3 satisfy equation (1b):

$$2.5 < \frac{\Sigma nBa - \Sigma nSr}{n_{Al}} < 4.5, \quad (1b)$$

wherein $\Sigma nBa$, $\Sigma nSr$ and $n_{Al}$ have the above meanings.

It is preferred in particular if the substance quantities of the compounds used in solutions 1 and 2, the optional further solution(s) and the basic solution 3 satisfy equation (1c):

$$3.8 < \frac{\Sigma nBa - \Sigma nSr}{n_{Al}} < 4.2, \quad (1c)$$

wherein $\Sigma nBa$, $\Sigma nSr$ and $n_{Al}$ have the above meanings.

Because of the above definition of the reaction conditions, i.e. via the quantity of available hydroxide ions or via equations (1), (1a), (1b) or (1c), sufficiently basic conditions prevail in the mixture of solutions 1 to 3 and the optional further solution(s), so that essentially all of the aluminium and silicon ions used are precipitated as mixed hydroxide. This is achieved in particular if, at the end of the reaction of solutions 1 to 3 and the optional further solution(s), the pH of the mixture lies in the range of from approximately 7 to 9, in particular in the range of from 7.5 to 9.

The significance of the above Formula (I) is outlined in the following exemplary representation for a mixture of solutions 1 and 2, the optional further solution(s) and the basic solution 3 with the respective bases and acids:

| Base/acid | Substance quantity [mol] | nBa $pK_b < 8$ [mol] | nBa $pK_b < 5$ [mol] | nSr $pK_s < 4.5$ [mol] | $n_{Al}$ [mol] |
|---|---|---|---|---|---|
| Na$_3$PO$_4$ | 1 | 2 × 1 | 1 × 1 | — | — |
| KOH | 3 | 1 × 3 | 1 × 3 | — | — |
| Na$_2$CO$_3$ | 1 | 2 × 1 | 1 × 1 | — | — |
| NaHSO$_4$ | 1.5 | — | — | 1 × 1.5 | — |
| AlCl$_3$ | 2 | — | — | — | 2 |
| ΣnBa | — | 7 | 5 | — | — |
| $\frac{\Sigma nBa - \Sigma nSr}{n_{Al}}$ | — | 2.75 | 1.75 | — | — |

Solution 1, solution 2, the optional (at least one) further solution and the basic solution 3 are usually present as aqueous solution. Optionally, the solutions can also be present independently of each other as alcohol-water mixtures and optionally contain further organic solvents, wherein e.g. also one solution can be present as aqueous solution, another solution as alcohol-water mixture and a further solution as aqueous solution containing organic solvent. Preferred alcohols used in solution 1, solution 2, the optional (at least one) further solution and the basic solution 3 are $C_{1-6}$ alcohols, such as methanol, ethanol, isopropanol and n-propanol, in particular ethanol, isopropanol and n-propanol. The alcohols or the further organic solvents, if present, are usually contained in a proportion of up to 20 wt.-%, preferably in a proportion of from 0.1 to 5 wt.-%, in particular from 1 to 3 wt.-%, relative to the total quantity of the respective solution.

Examples of the silicon source are sodium silicate, potassium silicate, silicon dioxide, silicic acid, such as precipitated silica or pyrogenic silicic acid, and alkoxysilanes, such as tetra-C1-C2-alkoxysilane. Sodium silicate, potassium silicate, silicon dioxide, precipitated silica and/or pyrogenic silicic acid are preferred silicon sources, sodium silicate and/or potassium silicate are particularly preferred.

Examples of the titanium source are titanium sulphate, titanium tetrachloride and titanium dioxide. Titanium sulphate and titanium tetrachloride are preferred titanium sources, titanium sulphate is particularly preferred.

Examples of the germanium source are germanium chloride and germanium hydroxide. Germanium chloride is a preferred germanium source.

Examples of the tin source are tin chloride, tin nitrate, tin sulphate and tin hydroxide. Tin chloride, tin nitrate and tin sulphate are preferred tin sources, tin sulphate is particularly preferred.

Examples of the phosphorus source are orthophosphoric acid, monopotassium dihydrogen phosphate, dipotassium monohydrogen phosphate, monosodium dihydrogen phosphate, disodium monohydrogen phosphate, tripotassium phosphate, and trisodium phosphate. Orthophosphoric acid, monopotassium dihydrogen phosphate, monosodium dihydrogen phosphate, tripotassium phosphate and trisodium phosphate are preferred phosphorus sources, tripotassium phosphate and trisodium phosphate are particularly preferred.

Examples of the aluminium source are aluminium sulphate, aluminium nitrate, aluminium chloride, aluminium hydroxide, aluminium oxide, aluminium alkoxide, sodium aluminate and potassium aluminate. Aluminium sulphate, aluminium nitrate, aluminium chloride, aluminium hydroxide, aluminium oxide, sodium aluminate and potassium aluminate are preferred aluminium sources, sodium aluminate, potassium aluminate, aluminium sulphate and aluminium nitrate are particularly preferred.

Examples of the boron source are boron hydroxide, boron nitrate, sodium tetraborate and boric acid. Sodium tetraborate and boron hydroxide are preferred boron sources, boron hydroxide is particularly preferred.

Examples of the gallium source are gallium nitrate, gallium sulphate and gallium hydroxide. Gallium nitrate and gallium sulphate are preferred gallium sources, gallium sulphate is particularly preferred.

Examples of the potassium source are potassium hydroxide, potassium carbonate, potassium hydrogen carbonate, potassium nitrate, potassium sulphate, potassium chloride, potassium bromide, tripotassium phosphate, monopotassium dihydrogen phosphate and dipotassium monohydrogen phosphate. Potassium hydroxide, potassium carbonate, potassium hydrogen carbonate, potassium nitrate, potassium sulphate, potassium chloride and potassium bromide are preferred potassium sources, potassium hydroxide, potassium carbonate, potassium hydrogen carbonate and potassium sulphate, in particular potassium hydroxide, are particularly preferred.

Examples of the iron source are iron nitrate, iron sulphate and iron chloride. Iron sulphate and iron chloride are preferred iron sources, iron sulphate is particularly preferred.

Examples of the indium source are indium nitrate and indium sulphate, indium sulphate is preferred.

In a preferred embodiment of the process according to the invention, solution 1 comprises a silicon source, in particular sodium silicate, potassium silicate, silicon dioxide and/or precipitated silica, and a phosphorus source, solution 2 comprises an aluminium source, in particular sodium aluminate, potassium aluminate, aluminium sulphate and/or aluminium nitrate, and the basic solution 3 comprises potassium hydroxide and/or sodium hydroxide.

In a further preferred embodiment of the process according to the invention, solution 1 comprises sodium silicate, solution 2 comprises aluminium sulphate and the basic solution 3 comprises potassium hydroxide and/or sodium hydroxide.

In a further preferred embodiment of the process according to the invention, solution 1 comprises sodium silicate, solution 2 comprises aluminium sulphate and the basic solution 3 comprises sodium aluminate.

In another preferred embodiment of the process according to the invention, solution 1 comprises sodium silicate, solution 2 comprises sulphuric acid or a sulphuric acid solution and the basic solution 3 comprises sodium aluminate.

The precipitate obtained by mixing solution 1, solution 2 and the optional at least one further solution with a basic solution 3 is usually isolated from the mixed solutions by filtration in order to obtain a mixed hydroxide. Then, optionally after washing with water, this mixed hydroxide can be dried e.g. at a temperature in the range of from 80 to 150° C., preferably at a temperature in the range of from 100 to 130° C., in particular at a temperature of approximately 120° C. The drying is not strictly necessary as the moist precipitate can be both stored and used in the moist state.

After isolation, both before and after the optional drying, the mixed hydroxide can be modified by ion exchange in aqueous solution e.g. with $Li^+$, $Na^+$, $K^+$, $Cs^+$, $Rb^+$, $NH_4^+$, $Be^{2+}$, $Mg^{2+}$, $Ca^{2+}$, $Sr^{2+}$ and/or $Ba^{2+}$, in particular with $K^+$, $NH_4^+$, $Mg^{2+}$, and/or $Ba^{2+}$, preferably with $K^+$ and/or $NH_4^+$.

The mixed hydroxide can then be converted to a synthesis gel by being dissolved or suspended in a basic solution 4. Moreover, the mixed hydroxide is suitable as binder if the aluminium ions are incorporated octahedrally, or for cation exchange (calcium-sodium exchange) if the aluminium ions are incorporated in tetrahedral coordination.

The basic solution 4 usually comprises an alkaline salt, an alkaline-earth salt and/or an ammonium salt, in particular potassium hydroxide, sodium hydroxide, ammonium hydroxide, potassium carbonate, sodium carbonate, barium hydroxide, magnesium hydroxide, calcium hydroxide and/or strontium hydroxide. The basic solution 4 preferably contains potassium hydroxide, sodium hydroxide, potassium carbonate and/or sodium carbonate. The basic solution 4 particularly preferably contains potassium hydroxide and potassium carbonate or sodium hydroxide and potassium carbonate or potassium hydroxide and sodium carbonate, quite particularly preferably potassium hydroxide and potassium carbonate.

The basic solution 4 is usually present as aqueous solution. Optionally, the basic solution 4 can be present as alcohol-water mixture and optionally contain further organic solvents. Preferred alcohols used in the basic solution 4 are $C_{1-6}$ alcohols, such as methanol, ethanol, isopropanol and n-propanol, in particular ethanol, isopropanol and n-propanol. The alcohols or the further organic solvents, if present, are usually contained in a proportion of up to 20 wt.-%, preferably in the range of from 0.1 to 5 wt.-%, relative to the total quantity of the basic solution 4.

The synthesis gel which can be obtained with the process according to the invention can be used in particular for the production of aluminium silicates, preferably for the production of zeolite L (aluminium silicate of the structure type LTL). For this, the synthesis gel is subjected to a hydrothermal treatment, for which the synthesis gel is usually heated at a defined temperature in a closed autoclave. The water present ensures an increased pressure inside the autoclave.

Synthesis gels with the following substance quantity ratios have been shown to be particularly suitable for the production of zeolite L:

$$(M_2O+NO)/SiO_2=0.15-1.0;$$

$$K^+/SiO_2=0.20-2.0;$$

$$H_2O/SiO_2=5.0-30.0;$$

$$SiO_2/Al_2O_3=3.0-20.0,$$

wherein M is selected from Li, Na, K and $NH_4$, and N is selected from Ba, Ca and Sr.

Synthesis gels with the following substance quantity ratios are particularly suitable for the production of zeolite L:

$$M_2O/SiO_2=0.40-0.50;$$

$$K^+/SiO_2=0.30-1.0;$$

$$H_2O/SiO_2=10.0-20.0;$$

$$SiO_2/Al_2O_3=5.0-12.0,$$

wherein M is selected from Na, K and $NH_4$.

The substance quantity ratio of $SiO_2$ to $Al_2O_3$ preferably lies in the range of from 7.0 to 10.0.

The $SiO_2/Al_2O_3$ ratio can be set by appropriate selection of the concentration and quantity of the silicon and aluminium sources in solution 1 and solution 2, as the silicon and aluminium ions are usually precipitated substantially quantitatively by this process. The $SiO_2/Al_2O_3$ ratio is changed only insignificantly by the isolation to obtain the mixed hydroxide.

The $(M_2O+NO)/SiO_2$ ratio can be set by the suitable quantity of alkali and alkaline-earth ions in solution 4 which is added to the mixed hydroxide for the formation of the synthesis gel. It is to be borne in mind here that already contained in the mixed hydroxide are alkali and optionally alkaline-earth ions which originate from solutions 1 to 3 as well as from the optional solution(s) and serve to equalize the charge between the predominantly tetrahedrally coordinated and uninegatively charged Al tetrahedron units in the mixed hydroxide. The quantity of the cations in the mixed hydroxide is thus roughly large enough that the negative charge of the Al tetrahedron units is equalized. With the step of isolation and optional washing the quantity of cations exceeding this which originates from solutions 1 to 3 as well as from the optional solution(s) is largely isolated and discarded with the filtrate, and thus is not present in the mixed hydroxide.

In a preferred embodiment, the process according to the invention is carried out under substantially alkaline-earth-free conditions.

In another preferred embodiment, the mixed hydroxide and/or synthesis gel according to the invention is substantially alkaline-earth-free.

The $H_2O/SiO_2$ ratio can be set by adding the suitable quantity of water to the mixed hydroxide.

The synthesis gel can now be converted to a zeolite L (i.e. an aluminium silicate of the structure type LTL) by hydrothermal treatment, for which the synthesis gel is usually heated at a defined temperature in a closed autoclave.

The aluminium silicate of the structure type LTL that can be obtained with the process according to the invention preferably has a specific surface area according to BET of less than 400 $m^2/g$, in particular in the range of from 220 to 380 $m^2/g$ and/or an average particle size $D_{50}$ in the range of from 30 nm to 5 µm, in particular from 50 to 3000 nm. The average particle size $D_{50}$ indicates a value at which 50 vol.-% of the particles have a diameter which is greater than the $D_{50}$ value and 50 vol.-% of the particles have a value which is smaller than the $D_{50}$ value. The average particle size $D_{50}$ can be determined for example by laser granulometry (DIN 13320-1).

The specific surface area is determined within the framework of the present invention by gas adsorption in accordance with Brunauer, Emmett and Teller (BET) according to DIN 66131 of July 1993. For this, the sample is dehydrated in particular under vacuum at 350° C. and then the nitrogen adsorption is measured at 77K.

The aluminium silicates according to the invention (zeolite L) are particularly suitable for the adsorption or conversion of hydrocarbons, in particular for the aromatization of aliphatic hydrocarbons. They are characterized here by high conversion rates and/or adsorption rates. It is likewise known that zeolite L can catalyze the reaction of ethylbenzene disproportionation (H. G. Karge et al., J. Weitkamp, H. G. Karge, H. Pfeifer and W. Holderich (eds.), Zeolite and related Microporous Materials Studies in Surface Science and Catalysis, Vol. 84, 1805-1812, 1994).

The following examples illustrate the process for producing a mixed hydroxide or synthesis gel according to the invention as well as the use thereof to produce a zeolite or zeolite-like material. Although these examples describe specific embodiments of the invention, they serve only to illustrate the invention and are not to be considered as limiting the invention in any way. As a person skilled in the art knows, numerous changes can be made to it without deviating from the scope of protection of the invention, as defined by the attached claims.

General Production Example

A solution of water and alkali hydroxide is placed in a precipitation chamber with a stirrer. At least one solution 1 with one solution 2 is added to this solution at a particular temperature and a particular pressure, wherein the raw precursor (mixed hydroxide) precipitates.

Solution 1 contains a silicon source and optionally a titanium source, a germanium source, a tin source and/or a phosphorus source. Solution 2 contains an aluminium source and optionally a boron source, a gallium source, an iron source, an indium source and/or a phosphorus source. In addition, further solutions can be added at the same time (concerted precipitation) or one after the other (sequential precipitation). This allows the use and suitable dosing of mixed sources, such as e.g. aluminium sulphate or sodium aluminate, in each case contained in aqueous solution. The addition of organic structure-directing agents or other agents which optionally influence the properties of the precursor is likewise possible. The obtained raw precursor suspension can be subjected to an ageing at a particular temperature and a particular pressure for a certain period of time. The batch can be stirred, but this is not strictly necessary.

The precipitated raw precursor (mixed hydroxide) is then isolated by suitable solid/liquid separation methods (e.g. filtration) and adhering residues of the mother liquor are removed by washing with water. At this point, the obtained raw precursor can be used directly, dried or modified by subsequent treatment (ion exchange, impregnation, etc.).

Finally, further agents (T-sources, structure-directing agents, mineralizers, seed crystals and/or solvents) can be added to the precursor (mixed hydroxide). The obtained synthesis gel is made to crystallize with usual hydrothermal methods.

Example A

Production of the Mixed Hydroxide 45.1 kg of a sodium water glass solution (10.4 wt.-% NaOH and 26.6 wt.-% $SiO_2$, PQ Corp.; solution 1) is placed in a receiver vessel, and 31.1 kg of an aluminium sulphate solution (8.1 wt.-% $Al_2O_3$, Giulini BK; solution 2) is placed in a further receiver vessel. In a 120-$dm^3$ agitator vessel, a solution of 5.02 kg potassium hydroxide (86 wt.-%, MERCK) in 38.9 kg demineralized water is prepared (solution 3). At ambient pressure (approximately 1 bar) and a temperature of 25° C., solutions 1 and 2 are introduced simultaneously into the agitator vessel with solution 3 accompanied by stirring at a volumetric flow rate of from 150 to 500 $cm^3$/min. The mixed hydroxide precipitates in the form of a precipitate. The pH is recorded to monitor the precipitation progress. At the end of the precipitation, a pH in the range of from 7.5 to 9 is achieved. The batch is then aged accompanied by stirring at 25° C. and at ambient pressure (approximately 1 bar) for three hours. The batch is transferred to a filter press, the solid portion is isolated, washed and then dried (120° C., 10 h). The chemical analysis of the obtained mixed hydroxide A (precursor) gives the following result:

| | |
|---|---|
| $SiO_2$ content: | 61.1 wt.-% |
| Loss on ignition: | 13.3 wt.-% |
| Si/Al substance quantity ratio: | 4.00 |
| K/Al substance quantity ratio: | 0.75 |
| Na/Al substance quantity ratio: | 0.31 |
| (Na + K)/Al substance quantity ratio: | 1.06 |

Further mixed hydroxides B, C and D were produced in the same way as described for mixed hydroxide A. The corresponding compositions of the solutions 1 to 3 used and the obtained mixed hydroxides are listed in Table 1. It is to be borne in mind that the potassium sources are partly differentiated on the basis of their origin in the examples and in Tables 1 and 2. Thus, $K^3$ is potassium of the mixed hydroxide, $K^1$ is potassium in the synthesis gel which originates from potassium hydroxide, $K^2$ is potassium in the synthesis gel which originates from potassium carbonate, and $K^{total}$ is the sum of the potassium species in the synthesis gel.

TABLE 1 production of the aluminosilicate mixed hydroxides and their final compositions

| Nature of the reactants | Mixed hydroxide A | Mixed hydroxide B | Mixed hydroxide C | Mixed hydroxide D |
|---|---|---|---|---|
| (Solution 1) | | | | |
| Wt.-% $SiO_2$ | 26.6 | 26.6 | 26.6 | 26.6 |
| Wt.-% NaOH | 10.4 | 10.4 | 10.4 | 10.4 |
| Weight of the reactants (g) | 45100 | 4060.1 | 3834.6 | 76700 |
| (Solution 2) | | | | |
| Wt.-% $Al_2(SO_4)3$ | 25.9 | 26.8 | 26.8 | 25.9 |
| Weight of the reactants (g) | 31100 | 2250.1 | 3010.5 | 54600 |
| (Solution 3) | | | | |
| Wt.-% KOH | 86 | 86 | 86 | 86 |
| Weight of the reactants (g) | 5020 | 227.9 | 576.8 | 8500 |
| Water (Solution 3) | | | | |
| Weight of the reactants (g) | 38900 | 3895.8 | 3034.6 | 64400 |
| Characterization of the obtained mixed hydroxide | | | | |
| Wt.-% $SiO_2$ | 61.1 | 68.3 | 59.4 | 24.4 |
| $SiO_2/Al_2O_3$ molar ratio | 8.00 | 9.82 | 7.02 | 8.14 |
| $Na_2O/Al_2O_3$ molar ratio | 0.31 | 0.41 | 0.33 | 0.29 |
| $K^3{}_2O/Al_2O_3$ molar ratio | 0.75 | 0.64 | 0.71 | 0.70 |
| Loss on ignition wt.-% | 13.3 | 8.6 | 14.1 | 68.1 |

Example 1

Production of a Synthesis Gel and an Aluminium Silicate of the Type LTL (Zeolite L)

The obtained precursor is then used for the following production of a synthesis gel:

In a pressure vessel, 1.56 kg potassium hydroxide (86 wt.-%, MERCK) and 2.26 kg potassium carbonate (99 wt.-%, PROLABO) are dissolved in 19 kg demineralized water. To this, 7.87 kg of the above-described mixed hydroxide A (precursor) is added. The obtained synthesis gel has the following molar composition:

[1.000$SiO_2$:0.125$Al_2O_3$:0.094$K_2O$:0.038$Na_2O$]:
0.150$K_2O$:0.200$K_2CO_3$:15.000$H_2O$ and is stirred for eight hours at 25° C. and under ambient pressure. Then the vessel is closed and heated to 130° C. within two hours accompanied by stirring. The stirrer is then switched off and the batch is kept at 130° C. for a further 30 h.

Figure 1:
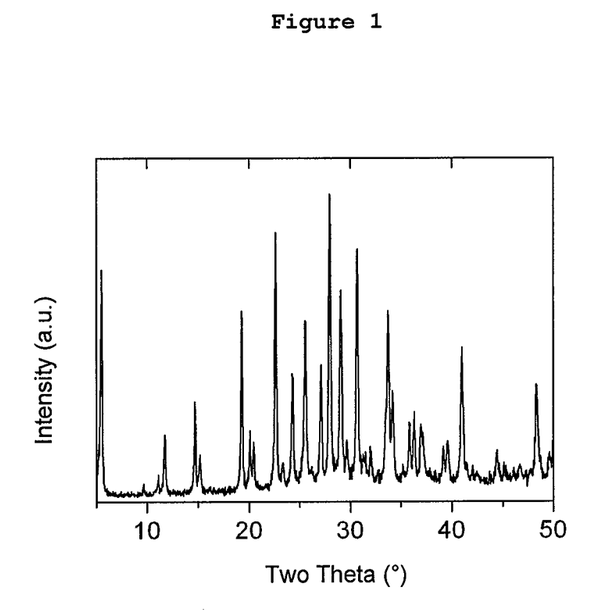
FIG. 1 is an X-ray powder diffractogram with reflection positions which correspond to the zeolite L of Example 1.

After cooling, the stirrer is switched on to produce a suspension and the pressure vessel is completely emptied. The obtained solid is filtered off, washed and dried at 120° C. for approximately ten hours. The obtained product displays an X-ray powder diffractogram (FIG. 1) with reflection positions which correspond to the zeolite L.

The chemical analysis of the obtained product gives the following molar composition:

1.00$Al_2O_3$:1.00$K_2O$:5.80$SiO_2$

Figure 2:
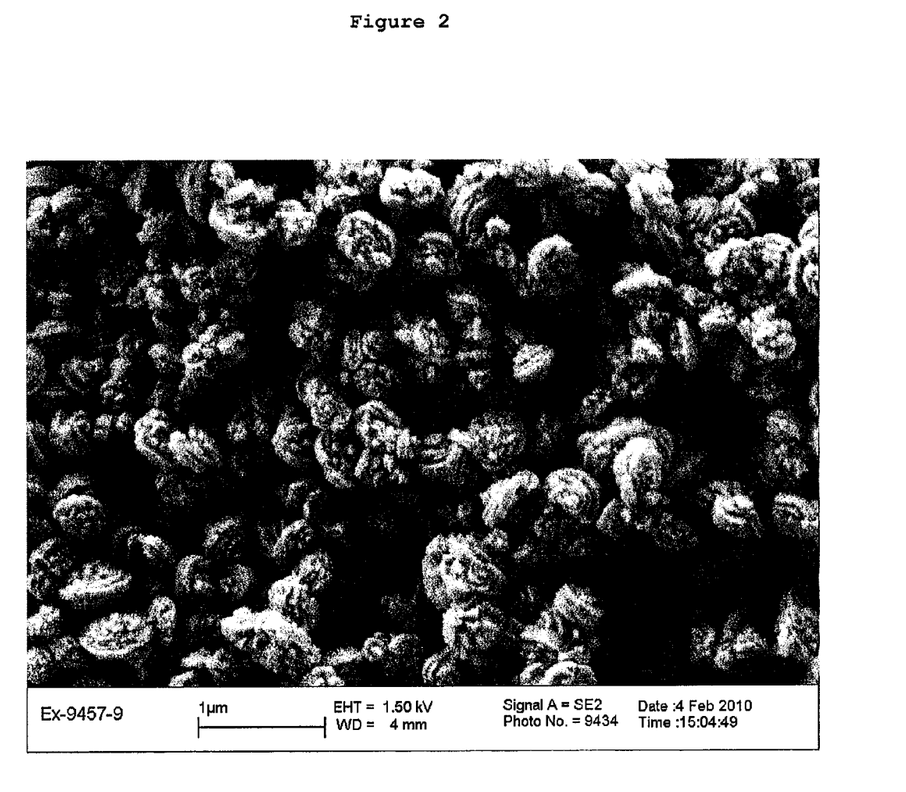
FIG. 2 is a scanning electron microscope investigation of Example 1.

A scanning electron microscope investigation shows (FIG. 2) that the obtained zeolite crystals have a size much smaller than 0.5 µm and a disc-shaped morphology. As can be seen from FIG. 2, an overgrowth ("intergrowth") can still occur on the flat disc-shaped basic structure. The disc-shaped basic particles have a diameter in the range of from 100 nm to 1000 nm and a height of from 50 nm to 300 nm. The diameter/height ratio lies between 1 and 3. For some of the crystals the diameter (D) and the height (H) of the zeolite crystals were measured and the morphological D/H ratio was determined from this. In addition, the diameter range and the length range, measured on a group of at least 20 particles, are given.

In the same way as described for Example 1, further synthesis gels or aluminium silicates were produced which are described in more detail in the following Examples 2 to 18. The heating times were two hours for the range of from 110° C. to 150° C., approximately 1.5 hours for 90° C. and approximately 2.5 hours for 170° C. A summary of the synthesis gels produced is given in Table 2. The syntheses described in Examples 1 to 18 are represented in Table 3. Finally, Table 4 shows the main characterizing features of the obtained zeolites L.

Production Examples 2 and 3

A synthesis gel is produced using the mixed hydroxide B (see Table 1) with an $SiO_2/Al_2O_3$ ratio (SAR) of approximately 10.

The basic solution 4 is produced by mixing two potassium sources, potassium hydroxide and potassium carbonate, wherein a molar composition of the finished gel of 0.15$K^1{}_2O$/$SiO_2$ and 0.20$K_2CO_3/SiO_2$ is obtained (see Table 2, synthesis gel n). The total potassium content in the mixed hydroxide gel $K^{total}{}_2O/SiO_2$ is 0.41.

The synthesis takes place over a period of 24 hours at 170° C. (Example 2, Table 3). The material collected after working up once the synthesis has ended is pure zeolite L according to the X-ray diffraction diagram. The Si/Al ratio in the end product of Example 2 is 3.1 (see Table 4).

Using the same molar gel composition, the synthesis was carried out at lower temperatures, 130° C. (Example 3, Table 3), with a synthesis duration of 48 hours. A pure material of the type zeolite L was identified by X-ray diffraction analysis, which shows that zeolite L can also be produced at lower temperatures and with longer synthesis times.

Production Examples 4 to 6

A synthesis gel is produced using the mixed hydroxide A (see Table 1) with an $SiO_2/Al_2O_3$ ratio (SAR) of approximately 8.

The basic solution 4 is produced by mixing two potassium sources, potassium hydroxide and potassium carbonate, wherein a molar composition of the finished gel of 0.15$K^1{}_2O$/$SiO_2$ and 0.20$K_2CO_3/SiO_2$ is obtained (see Table 2, synthesis gel 1). The total potassium content in the mixed hydroxide gel $K^{total}{}_2O/SiO_2$ is 0.44.

The synthesis takes place over a period of 15 hours at 150° C. (Example 4, Table 3). The material collected after working up once the synthesis has ended is pure zeolite L according to the X-ray diffraction diagram.

Using the same molar gel composition, the synthesis was able to be carried out at lower temperatures, 130° C. (Example 5, Table 3) and 110° C. (Example 6, Table 3), with a synthesis duration of 30 and 64 hours respectively. In both cases, pure materials of the type zeolite L were identified by X-ray diffraction analysis, and no peaks were detected which correspond to material of the type zeolite W. These results show that the reduction of the SAR in the gel from 10 to 8 with a chemical composition remaining constant leads to the formation of pure zeolite-L products with shorter synthesis duration and/or at lower synthesis temperature.

The Si/Al ratio of the end products obtained in Examples 4 to 6 is 2.9 (see Table 4), which is very similar to the ratio of the products which were obtained with an SAR of 10 in the mixed hydroxide gel (Examples 1 to 3).

Production Example 7

A synthesis gel is produced using the mixed hydroxide D (see Table 1) with an $SiO_2/Al_2O_3$ ratio (SAR) of approximately 8.14. The SAR of the mixed hydroxide D is identical to that of the mixed hydroxide A, but the mixed hydroxide D was not subjected to a drying step at the end of the filtration and therefore contains a higher water content. The influence of the quantity of water in the mixed hydroxide on the nature of the crystalline phase was investigated.

The basic solution 4 is produced by mixing two potassium sources, potassium hydroxide and potassium carbonate, wherein a molar composition of the finished gel of $0.15K^1_2O/SiO_2$ and $0.20K_2CO_3/SiO_2$ is obtained (see Table 2, synthesis gel m). The total potassium content in the mixed hydroxide gel $K^{total}_2O/SiO_2$ is 0.44.

The synthesis takes place over a period of 30 hours at 130° C. (Example 7, Table 3). The material collected after working up once the synthesis has ended is pure zeolite L according to the X-ray diffraction diagram (see X-ray diffraction diagram); no traces of a zeolite-W phase were observed. This shows that, if work is done with a constant molar gel composition and with a constant synthesis duration and temperature, the water content in the mixed hydroxide has no influence on the properties of the zeolite-L end product. Therefore, instead of a dry filter cake, a wet filter cake can also be used equally well.

Example 8

A synthesis gel is produced using the mixed hydroxide C (see Table 1) with a low $SiO_2/Al_2O_3$ ratio (SAR) of approximately 7. The basic solution 4 is produced by mixing two potassium sources, potassium hydroxide and potassium carbonate, wherein a molar composition of the finished gel of $0.15K^1_2O/SiO_2$ and $0.20K_2CO_3/SiO_2$ is obtained (see Table 2, synthesis gel k). The total potassium content in the mixed hydroxide gel $K^{total}_2O/SiO_2$ is 0.45.

The synthesis takes place over a period of 24 hours at 130° C. (Example 8, Table 3). The material collected after working up once the synthesis has ended is pure zeolite L according to the X-ray diffraction diagram. This example shows that pure zeolite-L products can be synthesized under these synthesis conditions by lowering the SAR in the mixed hydroxide gel to values of 7. In contrast to the syntheses carried out with an SAR of 10 (Example 3) and 8 (synthesis 5), however, the Si/Al molar ratio in the end product is much lower and lies close to 2.4.

Examples 9 to 11

Synthesis gels which contain only potassium hydroxide as potassium source were produced. The SAR in the synthesis gels was varied by changing the nature of the mixed hydroxide used and was 9.82 (Table 3, Example 9, mixed hydroxide C), 8.00 (Table 3, Example 10, mixed hydroxide A) and 7.02 (Table 3, Example 11, mixed hydroxide B). In all cases, a molar composition of the finished gel of $0.15K^1_2O/SiO_2$ in the basic solution 4 is obtained, and the total potassium content in the mixed hydroxide gel $K^{total}_2O/SiO_2$ lies in the range of 0.21-0.25. The X-ray diffraction diagrams of the collected materials have peaks which correspond to a material of the type Zeolite L, as well as clear traces of zeolite-W by-product, apparent from the typical 2θXRD reflections of 12.4°, 16.5°, 17.8, 28.1 and 30.4°.

These results suggest that the potassium content in the gel plays a role in the formation of pure zeolite-L product; a potassium content that is too low leads to the formation of a by-product, such as e.g. of zeolite W.

Examples 12 to 14

Synthesis gels which contain potassium hydroxide in a smaller amount and a second potassium source (potassium carbonate) were produced. When using these gels, the total potassium content was kept at a high level. In all cases, a molar composition of the finished gel of $0.10K^1_2O/SiO_2$ and $0.20K_2CO_3/SiO_2$ (see Table 2) in the basic solution 4 is obtained, and the total potassium content in the mixed hydroxide gel $K^{total}_2O/SiO_2$ lies in the range of 0.36-0.40. The SAR in the synthesis gels was varied by changing the nature of the mixed hydroxide used and was 9.82 (Table 3, Example 14, mixed hydroxide B), 8.00 (Table 3, Example 13, mixed hydroxide A) and 7.02 (Table 3, Example 12, mixed hydroxide C). Irrespective of the SAR in the original synthesis gels, the X-ray diffraction diagrams of the collected materials have peaks which correspond to a material of the type zeolite L, as well as a broad signal (background) which suggests the presence of amorphous substances in the product. No evidence of a zeolite-W by-product was discovered. These results show that a low alkali $K^1_2O/SiO_2$ in the mixed hydroxide gel, coupled with a high total potassium content $K^{total}_2O/SiO_2$, influences the kinetics of the crystallization, but not the nature of the crystalline phase.

Example 15

Synthesis gels which contain potassium hydroxide in a smaller amount and a smaller amount of the second potassium source (potassium carbonate) were produced. In all cases, a molar composition of the finished gel of $0.10K^1_2O/SiO_2$ and $0.10K_2CO_3/SiO_2$ (see Table 2) in the basic solution 4 is obtained, and the total potassium content in the mixed hydroxide gel $K^{total}_2O/SiO_2$ is 0.26. The SAR in the synthesis gels was 9.82 (Table 3, Example 15, mixed hydroxide B).

The X-ray diffraction diagram of the collected material has peaks which correspond to a mixture of material of the type zeolite L with traces of zeolite-W by-product as well as a clear residue of amorphous substances in the product. This result shows that a low alkali $K^1_2O/SiO_2$ in the mixed hydroxide gel, coupled with a low total potassium content $K^{total}_2O/SiO_2$, influences the nucleation as well as the kinetics of the crystallization of the gel.

Example 16

A synthesis gel which contains potassium hydroxide in a smaller amount and a smaller amount of the second potassium source (potassium carbonate) was produced. The molar composition of the finished gel is $0.10K^1_2O/SiO_2$ and $0.05K_2CO_3/SiO_2$ (see Table 2, synthesis gel b) in the basic solution 4, and the total potassium content in the mixed hydroxide gel $K^{total}_2O/SiO_2$ is 0.21.

The SAR in the synthesis gels was 9.82 (Table 3, Example 16, mixed hydroxide B). The X-ray diffraction diagram of the collected material shows that the end material is completely amorphous. This result shows that a low alkali $K^1_2O/SiO_2$ in the mixed hydroxide gel, coupled with a total potassium content $K^{total}_2O/SiO_2$ that is too low, no longer leads to the formation of zeolite L.

Example 17

A synthesis gel which contains a low potassium hydroxide content as well as a small amount of the second potassium source (potassium carbonate) was produced. The molar composition of the finished gel is $0.05K^1_2O/SiO_2$ and $0.30K_2CO_3/SiO_2$ (see Table 2, synthesis gel a) in the basic solution 4, and the total potassium content in the mixed hydroxide gel $K^{total}_2O/SiO_2$ is 0.44. The SAR in the synthesis gels was 8.0 (Table 1, mixed hydroxide A).

The X-ray diffraction diagram of the collected material shows that the end material is completely amorphous. This result shows that, although the total potassium content $K^{total}_2O/SiO_2$ is high enough, an alkali $K^1_2O/SiO_2$ in the mixed hydroxide gel that is too low does not lead to the formation of zeolite L.

Example 18

A synthesis gel which has a high potassium hydroxide content and no second potassium source was produced. The molar composition of the finished gel of $0.30K^1_2O/SiO_2$ and $0.00K_2CO_3/SiO_2$ (see Table 2, synthesis gel o) in the basic solution 4 is obtained, and the total potassium content in the mixed hydroxide gel $K^{total}_2O/SiO_2$ is 0.36. The SAR in the synthesis gels was 9.82 (Table 1, mixed hydroxide B).

The X-ray diffraction diagram of the collected product has typical zeolite-L peaks with weak intensity, which shows that the end material contains a large quantity of amorphous product as well as some zeolite L. This result shows that, although the total potassium content $K^{total}_2O/SiO_2$ is high enough, a $K^1_2O/SiO_2$ in the mixed hydroxide gel that is too strongly alkaline does not lead to the formation of a highly crystalline zeolite L.

All of these examples clearly show that there is an optimally alkaline $K^1_2O/SiO_2$ in the mixed hydroxide gel (in the range of from 0.10 to 0.15), coupled with an optimal total potassium content $K^{total}_2O/SiO_2$ in the mixed hydroxide gel (in the range of from 0.35 to 0.50).

TABLE 2

Molar gel composition of the synthesis gels produced with the help of the mixed hydroxides

| | Type of | Weight of the reactants (g) | | | | Molar composition of the mixed oxide | | |
|---|---|---|---|---|---|---|---|---|
| | | | | Solution 4 | | | | |
| Synthesis gel | mixed hydroxide | Mixed hydroxide | $H_2O$ | $K^1OH$ 86 wt.-% | $K^2_2CO_3$ 99 wt.-% | $SiO_2/Al_2O_3$ | $K^3_2O/SiO_2$ | $Na_2O/SiO_2$ |
| a | A | 98.4 | 255.7 | 6.6 | 42.0 | 8.00 | 0.09 | 0.04 |
| b | B | 87.9 | 260.6 | 13.2 | 7.2 | 9.82 | 0.06 | 0.04 |
| c | B | 88.0 | 260.6 | 13.1 | 14.1 | 9.82 | 0.06 | 0.04 |
| d | C | 101.6 | 253.7 | 13.1 | 27.8 | 7.02 | 0.10 | 0.05 |
| e | A | 98.5 | 254.9 | 13.2 | 27.8 | 8.00 | 0.09 | 0.04 |
| f | B | 69.7 | 208.5 | 10.5 | 22.3 | 9.82 | 0.06 | 0.04 |
| h | C | 101.5 | 252.8 | 19.7 | 0.0 | 7.02 | 0.10 | 0.05 |
| i | A | 78.3 | 203.6 | 15.7 | 0.0 | 8.00 | 0.09 | 0.04 |
| j | B | 87.3 | 260.1 | 19.7 | 0.0 | 9.82 | 0.06 | 0.04 |
| k | C | 126.8 | 316.2 | 24.5 | 34.8 | 7.02 | 0.10 | 0.05 |
| l | A | 7870.0 | 19011.2 | 1560.0 | 2260.0 | 8.00 | 0.09 | 0.04 |
| m | D | 24600.0 | 8903.3 | 1952.1 | 2793.3 | 8.14 | 0.09 | 0.04 |
| n | B | 87.2 | 259.8 | 19.5 | 27.9 | 9.82 | 0.06 | 0.04 |
| o | B | 87.7 | 257.2 | 39.2 | 0.0 | 9.82 | 0.06 | 0.04 |

| | Type of | Molar gel composition in solution 4 | | | Total molar gel composition | | | | |
|---|---|---|---|---|---|---|---|---|---|
| Synthesis gel | mixed hydroxide | $K^1_2O/SiO_2$ | $K^2_2CO_3/SiO_2$ | $H_2O/SiO_2$ | $SiO_2/Al_2O_3$ | $K^1_2O/SiO_2$ | $Na_2O/SiO_2$ | $H_2O/SiO_2$ | $K^{total}_2O/SiO_2$ |
| a | A | 0.05 | 0.30 | 15.00 | 8.00 | 0.05 | 0.04 | 15.00 | 0.44 |
| b | B | 0.10 | 0.05 | 15.00 | 9.82 | 0.10 | 0.04 | 15.00 | 0.21 |
| c | B | 0.10 | 0.10 | 15.00 | 9.82 | 0.10 | 0.04 | 15.00 | 0.26 |
| d | C | 0.10 | 0.20 | 15.00 | 7.02 | 0.10 | 0.05 | 15.00 | 0.40 |
| e | A | 0.10 | 0.20 | 15.00 | 8.00 | 0.10 | 0.04 | 15.00 | 0.39 |
| f | B | 0.10 | 0.20 | 15.00 | 9.82 | 0.10 | 0.04 | 15.00 | 0.36 |
| h | C | 0.15 | 0.00 | 15.00 | 7.02 | 0.15 | 0.05 | 15.00 | 0.25 |
| i | A | 0.15 | 0.00 | 15.00 | 8.00 | 0.15 | 0.04 | 15.00 | 0.24 |
| j | B | 0.15 | 0.00 | 15.00 | 9.82 | 0.15 | 0.04 | 15.00 | 0.21 |
| k | C | 0.15 | 0.20 | 15.00 | 7.02 | 0.15 | 0.05 | 15.00 | 0.45 |
| l | A | 0.15 | 0.20 | 15.00 | 8.00 | 0.15 | 0.04 | 15.00 | 0.44 |
| m | D | 0.15 | 0.20 | 4.95 | 8.14 | 0.15 | 0.04 | 15.00 | 0.44 |
| n | B | 0.15 | 0.20 | 15.00 | 9.82 | 0.15 | 0.04 | 15.00 | 0.41 |
| o | B | 0.30 | 0.00 | 15.00 | 9.82 | 0.30 | 0.04 | 15.00 | 0.36 |

TABLE 3

Syntheses carried out by using the different synthesis gels under different synthesis conditions

| Example | Synthesis gel | T (° C.) | Time (h) | Result |
|---|---|---|---|---|
| 1 | n | 150 | 30 | zeolite L |
| 2 | n | 170 | 24 | zeolite L |
| 3 | n | 130 | 48 | zeolite L |
| 4 | l | 150 | 15 | zeolite L |
| 5 | l | 130 | 30 | zeolite L |
| 6 | l | 110 | 64 | zeolite L |
| 7 | m | 130 | 30 | zeolite L |
| 8 | k | 130 | 24 | zeolite L |
| 9 | h | 130 | 30 | zeolite L + zeolite W |
| 10 | i | 130 | 30 | zeolite L + zeolite W |
| 11 | j | 170 | 48 | zeolite L + zeolite W |
| 12 | d | 130 | 24 | zeolite L + amorphous |
| 13 | e | 130 | 72 | zeolite L + amorphous |
| 14 | f | 170 | 24 | zeolite L + amorphous |
| 15 | c | 170 | 24 | zeolite W + zeolite L + amorphous |
| 16 | b | 170 | 24 | amorphous |
| 17 | a | 130 | 72 | amorphous |
| 18 | o | 90 | 96 | amorphous + zeolite L |

TABLE 4

Main characterizing features of the obtained zeolites L.

| Example | H (μm) | D (μm) | D/H ratio | BET (m$^2$/g) | Si/Al | K/Al |
|---|---|---|---|---|---|---|
| 1 | 0.05-0.30 | 0.10-1.00 | 1.00-3.00 | — | 2.90 | 1.00 |
| 2 | 0.60-1.00 | 1.00-2.00 | 1.00-1.50 | 320 | 3.10 | 0.99 |
| 4 | 0.30-0.50 | 0.50-1.00 | 1.50-2.00 | 365 | 2.90 | 0.99 |
| 5 | 0.05-0.50 | 0.20-0.70 | 1.50-3.00 | 380 | 2.90 | 0.99 |
| 6 | 0.05-0.30 | 0.20-0.70 | 2.00-3.00 | 370 | 2.90 | 0.99 |
| 8 | — | — | — | 320 | 2.40 | 0.99 |

The invention claimed is:

1. Process for producing a synthesis gel, comprising:

(1) mixing a solution 1, and a solution 2, with a basic solution 3 in order to obtain a precipitate, (2) isolating the precipitate in order to obtain a mixed hydroxide, (3) dissolving or suspending the mixed hydroxide in a basic solution 4 in order to obtain a synthesis gel, wherein solution 1 comprises a silicon source, solution 2 comprises an aluminium source, and the substance quantities of the compounds used in solutions 1 and 2, and the basic solution 3 satisfy equation (1):

$$1 < \frac{\Sigma nBa - \Sigma nSr}{n_{Al}} \tag{1}$$

wherein:

ΣnBa: means the sum of the substance quantities of the bases used Ba with a pK$_B$<8 in each case multiplied by the number n of proton-transfer reaction stages with a pK$_B$<8, ΣnSr: means the sum of the substance quantities of acids used Sr with a pK$_S$<4.5, in each case multiplied by the number n of proton-transfer reaction stages with a pK$_S$<4.5, n$_{Al}$: means the sum of the substance quantities of the aluminium used and wherein basic solution 4 comprises potassium hydroxide and a further potassium source, dissolved in water or a water-alcohol mixture, and wherein the substance quantities of potassium hydroxide and the further potassium source are chosen such that K$^1$$_2$O/SiO$_2$ in the synthesis gel is in the range of 0.10 to 0.15, and K$^{total}$$_2$O/SiO$_2$ in the synthesis gel is in the range of 0.35 to 0.50, wherein K$^1$ is potassium in the synthesis gel which originates from potassium hydroxide in solution 4, and K$^{total}$ is the sum of the potassium species in the synthesis gel.

2. Process according to claim 1, wherein ΣnBa means the sum of the substance quantities of the bases used Ba with a pK$_B$<5 in each case multiplied by the number n of proton-transfer reaction stages with a pK$_B$<5.

3. Process according to claim 1, wherein the substance quantities of the compounds used in solutions 1 and 2, and the basic solution 3 satisfy equation (1a):

$$1 < \frac{\Sigma nBa - \Sigma nSr}{n_{Al}} < 5. \tag{1a}$$

4. Process according to claim 1, wherein solution 1 comprises a silicon source and a phosphorus source.

5. Process according to claim 1, wherein solution 2 comprises an aluminium source and a phosphorus source.

6. Process according to claim 1, wherein the silicon source is at least one member selected from the group consisting of sodium silicate, potassium silicate, silicon dioxide, and silicic acid, and an alkoxysilane, the aluminium source is at least one member selected from the group consisting of aluminium sulphate, aluminium nitrate, aluminium chloride, aluminium hydroxide, aluminium oxide, aluminium alkoxide, sodium aluminate and potassium aluminate, and the potassium source is at least one member selected from the group consisting of potassium carbonate, potassium hydrogen carbonate, potassium nitrate, potassium sulphate, potassium chloride, potassium bromide, tripotassium phosphate, monopotassium dihydrogen phosphate and dipotassium monohydrogen phosphate.

7. Process according to claim 1, wherein solution 1 comprises a silicon source, selected from the group consisting of sodium silicate, potassium silicate, silicon dioxide and precipitated silica, and solution 2 comprises an aluminium source selected from the group consisting of sodium aluminate, potassium aluminate, aluminium sulphate and aluminium nitrate.

8. Process according to claim 1, wherein the basic solution 3 is selected from the group consisting of potassium hydroxide, sodium hydroxide and ammonium hydroxide, dissolved in water or a water-alcohol mixture.

9. Process according to claim 1 further comprising at least one further solution selected from the group consisting of an alkaline salt, an alkaline-earth salt and an ammonium salt, dissolved in water or a water-alcohol mixture.

10. Process according to claim 1, wherein the precipitate of step (2) is modified by ion exchange in an aqueous solution with at least one of the following cations selected from the group consisting of:

$Li^+$, $Na^+$, $K^+$, $Cs^+$, $Rb^+$, $NH_4^+$, $Be^{2+}$, $Mg^{2+}$, $Ca^{2+}$, $Sr^{2+}$ and $Ba^2$.

11. Synthesis gel obtained by a process according to claim 1, the substance quantities satisfy the following conditions:

$$K^1_2O/SiO_2 = 0.01\text{-}0.15, \text{ and}$$

$$K^{total}_2O/SiO_2 = 0.35\text{-}0.50,$$

wherein $K^1$ is potassium in the synthesis gel which originates from potassium hydroxide in solution 4, and $K^{total}$ is the sum of the potassium species in the synthesis gel.

12. Synthesis gel according to claim 11, wherein the substance quantities satisfy the following conditions:

| | |
|---|---|
| $(M_2O + NO)/SiO_2$ | 0.15-1.0 |
| $K^+/SiO_2$ | 0.2-2.0 |
| $H_2O/SiO_2$ | 5.0-30.0 |
| $SiO_2/Al_2O_3$ | 3.0-20.0, | wherein M is selected from Li, Na, K and $NH_4$, and N is selected from Ba, Ca and Sr.

13. Synthesis gel according to claim 12, wherein the substance quantity ratio of $SiO_2$ to $Al_2O_3$ is in the range of from 7.0 to 10.0.

14. Process for producing an aluminium silicate comprising subjecting the synthesis gel according to claim 11 to a hydrothermal treatment.

15. Aluminium silicate of the structure type LTL obtained by the process of claim 14.

16. Aluminium silicate according to claim 15, which has a specific surface area according to BET of less than 400 $m^2/g$ or a particle size $D_{50}$ in the range of from 30 nm to 5 µm.

17. The process of claim 1 wherein solution 1 further comprises one or more sources selected from the group consisting of a titanium source, a germanium source, a tin source and a phosphorous source in a water or a water-alcohol mixture.

18. The process of claim 1 wherein solution 2 further comprises one or more sources selected from the group consisting of a boron source, a gallium source, an indium source, an iron source and a phosphorous source in a water or a water-alcohol mixture.

19. The process of claim 17 wherein the titanium source is at least one member selected from the group consisting of titanium sulphate, titanium tetrachloride and titanium dioxide, the germanium source is at least one member selected from the group consisting of germanium chloride and germanium hydroxide, the tin source is at least one member selected from the group consisting of tin chloride, tin nitrate, tin sulphate and tin hydroxide, and the phosphorus source is at least one member selected from the group consisting of orthophosphoric acid, monopotassium dihydrogen phosphate, dipotassium monohydrogen phosphate, monosodium dihydrogen phosphate, disodium monohydrogen phosphate, tripotassium phosphate, and trisodium phosphate.

20. The process of claim 18, wherein the boron source is at least one member selected from the group consisting of boron nitrate, boron hydroxide, sodium tetraborate and boric acid, the gallium source is at least one member selected from the group consisting of gallium nitrate, gallium sulphate and gallium hydroxide, the indium source is at least one member selected from the group consisting of indium nitrate and indium sulphate, the iron source is at least one member selected from the group consisting of iron nitrate, iron sulphate and iron chloride, and the phosphorus source is at least one member selected from the group consisting of orthophosphoric acid, monopotassium dihydrogen phosphate, dipotassium monohydrogen phosphate, monosodium dihydrogen phosphate, disodium monohydrogen phosphate, tripotassium phosphate, and trisodium phosphate.

21. Aluminium silicate according to claim 15 having a disk-shaped basic structure with a diameter in the range from 100 nm to 1000 nm, a height of from 50 nm to 300 nm and a diameter/height ratio between 1.0 and 3.0.

22. A process for conversion or adsorption of hydrocarbons comprising passing a hydrocarbon over the aluminium silicate produced by the process of claim 15.

* * * * *